(12) United States Patent  
Gerard

(10) Patent No.: US 9,424,590 B2  
(45) Date of Patent: Aug. 23, 2016

(54) METHOD AND SYSTEM FOR REAL TIME TARGETED ADVERTISING IN A RETAIL ENVIRONMENT

(71) Applicant: MASTERCARD INTERNATIONAL INCORPORATED, Purchase, NY (US)

(72) Inventor: Jean-Pierre Gerard, Croton-on-Hudson, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 14/151,978

(22) Filed: Jan. 10, 2014

(65) Prior Publication Data

US 2015/0199716 A1    Jul. 16, 2015

(51) Int. Cl.
*G06Q 30/00* (2012.01)
*G06Q 30/02* (2012.01)
*H04W 4/00* (2009.01)

(52) U.S. Cl.
CPC ........ *G06Q 30/0255* (2013.01); *G06Q 30/0201* (2013.01); *G06Q 30/0269* (2013.01); *H04W 4/008* (2013.01)

(58) Field of Classification Search
CPC ................................................. G06Q 30/0255
See application file for complete search history.

(56) References Cited

U.S. PATENT DOCUMENTS

| | | | | |
|---|---|---|---|---|
| 5,557,513 A | * | 9/1996 | Frey ................... | G06Q 10/0631 705/16 |
| 5,802,492 A | * | 9/1998 | DeLorme ........... | G01C 21/3476 340/990 |
| 8,447,331 B2 | * | 5/2013 | Busch .......................... | 370/338 |
| 2007/0188324 A1 | * | 8/2007 | Ballin ................... | G06Q 10/08 340/572.1 |
| 2010/0100424 A1 | * | 4/2010 | Buchanan .............. | G06Q 20/10 705/35 |
| 2011/0087546 A1 | * | 4/2011 | Fordyce et al. ........... | 705/14.53 |

* cited by examiner

*Primary Examiner* — Amanda Abrahamson
*Assistant Examiner* — Scott C Anderson
(74) *Attorney, Agent, or Firm* — Ohlandt, Greeley, Ruggiero & Perle, L.L.P.

(57) ABSTRACT

A method and a system for real time targeted advertising using purchase transaction data and payment card holder activity and location information in a retail environment. The system includes a radio frequency identification (RFID) reader situated in a retail environment. The RFID reader communicates with an RFID tag that is situated on a payment card of a payment card holder to track the payment card holder as the payment card holder walks around in the retail environment. The system also includes a processor configured to select a predictive behavioral model based on payment activities attributable to the payment card holder and payment card holder activity and location in a retail environment, associate the predictive behavioral model with merchant advertising information, and convey the associated information to a merchant to enable the merchant to make a targeted offer to the payment card holder.

11 Claims, 5 Drawing Sheets

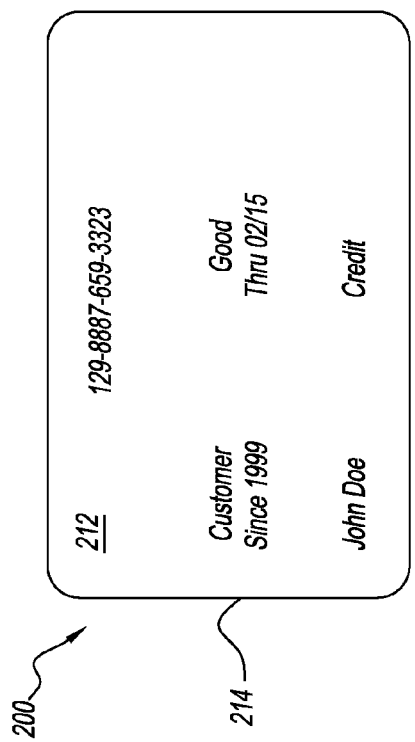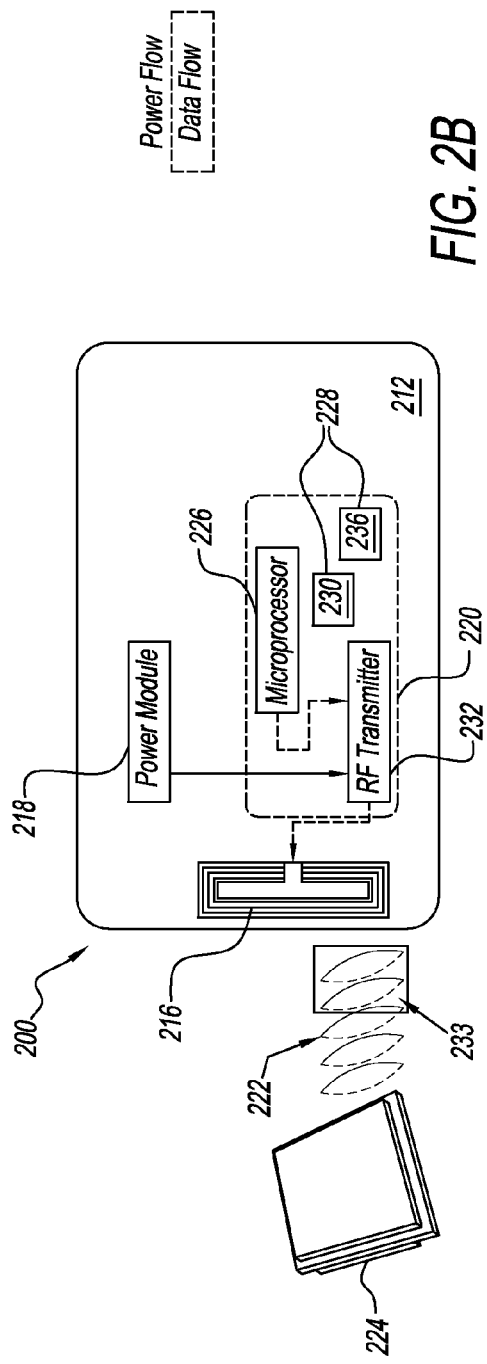

METHOD AND SYSTEM FOR REAL TIME TARGETED ADVERTISING IN A RETAIL ENVIRONMENT

BACKGROUND OF THE DISCLOSURE

1. Field of the Disclosure

The present disclosure relates to real time targeted advertising using purchase transaction data, payment card holder activity, and location information in a retail environment. More particularly, the present disclosure relates to a method and a system to enable a merchant to make a targeted offer to payment card holders on a real time basis in a retail environment.

2. Description of the Related Art

The vast majority of advertising content is delivered to consumers at a time when consumers are not actively making a purchasing decision or not in a retail environment. For example, advertising content in the form of consumer promotions, such as coupons, are delivered in physical form via mail or in free standing inserts in newspapers or other forms of published media. To be effective, these consumer promotions must not only be viewed by consumers—a daunting problem, given the size of newspapers, magazines and other print media—but must also generate a sufficient impression on consumers to cause consumers to change their purchasing behavior when later shopping at a retail store. Given the hurdles for consumer promotions to be successful, it is therefore not surprising that the vast majority of coupons are never actually redeemed and that return on advertising dollar spent can be quite small.

As another example, the presentation of advertising on television has long been one of the most important channels for advertisers to reach consumers with advertising content. While advertisers may be more confident that consumers are actually being exposed to advertising content that is presented on television, consumers receive the content at a time when they are engaged in the passive activity of watching television programming. As with print ads, the advertiser must therefore count on the advertising content making a sufficiently large enough impression on consumers to cause consumers to later change their purchasing behavior at a point of purchase.

With the creation of the World Wide Web and the launch of commercial websites through which products and services could be purchased, some of the challenges of reaching consumers at a time when consumers are making a purchase decision changed. By advertising on websites, advertisers were suddenly able to target consumers based on the website that they are visiting, the products or services that they are looking at and considering purchasing, and other characteristics of the consumer, such as past purchases or express indications of preference. By moving advertising online and closer to a consumer's point of purchase, advertisers are able to have a greater impact on the purchasing behavior of consumers. A shortcoming of advertising on websites, however, is that only a fraction of total purchase transactions are performed on the web. Most purchases are still completed in brick-and-mortar stores.

Although websites have allowed advertisers to move closer to the point of purchase, the vast majority of advertising is still being delivered to consumers via print or television media at a time and location distant from the point of purchase. To date, no solution has been able to combine the effectiveness of online advertising to the inherent volume advantage provided by traditional brick-and-mortar retailers.

SUMMARY OF THE DISCLOSURE

The present disclosure provides a method and a system for real time targeted advertising using purchase transaction data, payment card holder activity, and location information in a retail environment.

The present disclosure also provides a method and a system that enables a merchant to make a targeted offer to payment card holders on a real time basis in a retail environment.

The present disclosure further provides a method comprising: retrieving from one or more databases a first set of information comprising payment card holder information including at least purchasing and payment activities attributable to the payment card holders; retrieving from one or more databases a second set of information comprising payment card holder activity and location in a retail environment, in which the retail environment has at least one radio frequency identification (RFID) reader and the payment card holder has at least one payment card having at least one RFID tag, and in which the at least one RFID reader is capable of operably communicating with the at least one RFID tag to determine activity and location of the payment card holder in the retail environment; retrieving from one or more databases a third set of information comprising merchant advertising information; generating one or more predictive behavioral models based at least in part on the first set of information and the second set of information; associating the one or more predictive behavioral models with the third set of information; and conveying at least a portion of the associated information to a merchant to enable the merchant to make one or more targeted offers to the payment card holder.

The present disclosure still further provides a system comprising: one or more databases configured to store a first set of information comprising payment card holder information including at least purchasing and payment activities attributable to the payment card holders; one or more databases configured to store a second set of information comprising payment card holder activity and location in a retail environment in which the retail environment has at least one RFID reader and the payment card holder has at least one payment card having at least one RFID tag, and in which the at least one RFID reader is capable of operably communicating with the at least one RFID tag to determine activity and location of the payment card holder in the retail environment; and one or more databases configured to store a third set of information comprising merchant advertising information. The system further comprises a processor configured to: generate one or more predictive behavioral models based at least in part on the first set of information and the second set of information; associate the one or more predictive behavioral models with the third set of information; and convey at least a portion of the associated information to a merchant to enable the merchant to make one or more targeted offers to the payment card holder.

The present disclosure yet further provides a method for generating one or more predictive behavioral models. The method comprises: retrieving from one or more databases a first set of information comprising payment card holder information including at least purchasing and payment activities attributable to the payment card holders; retrieving from one or more databases a second set of information comprising payment card holder activity and location in a retail environment in which the retail environment has at least one RFID reader and the payment card holder has at least one payment card having at least one RFID tag and in which the at least one RFID reader is capable of operably communicating with the at least one RFID tag to determine activity and location of the payment card holder in the retail environment; analyzing the first set of information and the second set of information to determine behavioral information of the one or more payment card holders; extracting information related to an intent of the one or more payment card holders from the behavioral information; and generating one or more predictive behavioral models based on the behavioral information and intent of the one or more payment card holders with the one or more payment card holders having a propensity to carry out certain activities based on the one or more predictive behavioral models.

BRIEF DESCRIPTION OF THE DRAWINGS

FIGS. 2A and 2B are views of an embodiment of a payment card having a RFID tag.

A component or a feature that is common to more than one drawing is indicated with the same reference number in each drawing.

DESCRIPTION OF THE PREFERRED EMBODIMENTS

Figure 1:
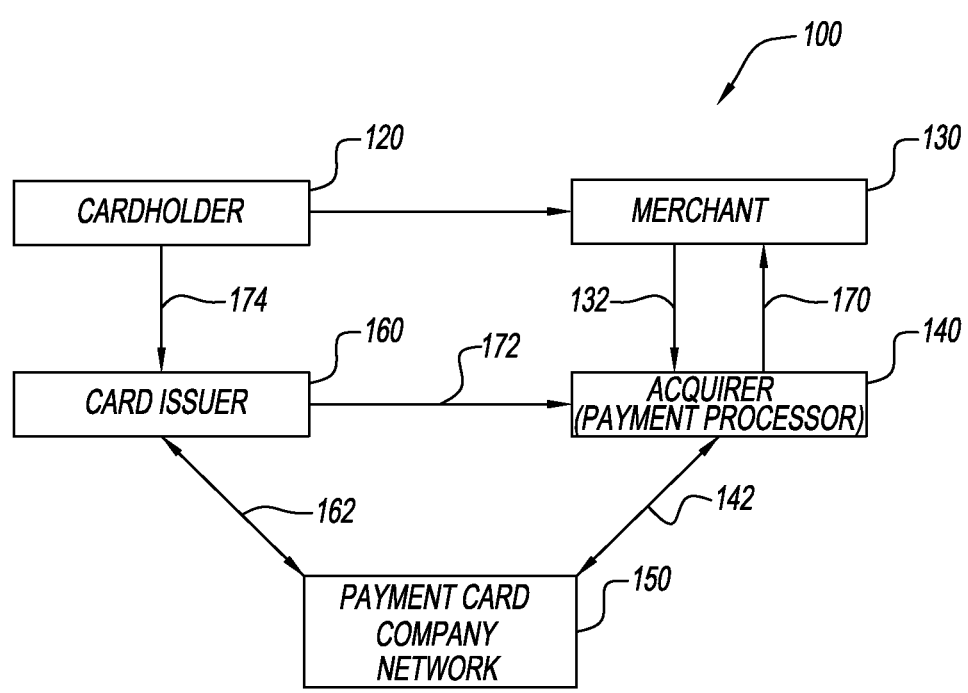
FIG. 1 is a diagram of a four party payment card system.

Embodiments of the present disclosure are described more fully hereinafter with reference to the accompanying drawings, in which some, but not all, embodiments of the present disclosure are shown. Indeed, the present disclosure can be embodied in many different forms and should not be construed as limited to the embodiments set forth herein. Rather, these embodiments are provided so that this disclosure clearly satisfies applicable legal requirements. Like numbers refer to like elements throughout.

As used herein, entities can include one or more persons, organizations, businesses, institutions and/or other entities, such as financial institutions, services providers, and the like that implement one or more portions of one or more of the embodiments described and/or contemplated herein. In particular, entities can include a person, business, school, club, fraternity or sorority, an organization having members in a particular trade or profession, sales representative for particular products, charity, not-for-profit organization, labor union, local government, government agency, or political party.

The steps and/or actions of a method described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some embodiments, the processor and the storage medium can reside in an Application Specific Integrated Circuit (ASIC). In the alternative, the processor and the storage medium can reside as discrete components in a computing device. Additionally, in some embodiments, the events and/or actions of a method can reside as one or any combination or set of codes and/or instructions on a machine-readable medium and/or computer-readable medium, which can be incorporated into a computer program product.

In one or more embodiments, the functions described can be implemented in hardware, software, firmware, or any combination thereof. If implemented in software, the functions can be stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection can be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc" as used herein include compact disc (CD), laser disc, optical disc, digital versatile disc (DVD), floppy disk and blu-ray disc where disks usually reproduce data magnetically, while discs usually reproduce data optically with lasers. Combinations of the above are included within the scope of computer-readable media.

Computer program code for carrying out operations of embodiments of the present disclosure can be written in an object oriented, scripted or unscripted programming language such as Java, Perl, Smalltalk, C++, or the like. However, the computer program code for carrying out operations of embodiments of the present disclosure can also be written in conventional procedural programming languages, such as the "C" programming language or similar programming languages.

Embodiments of the present disclosure are described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer readable memory produce an article of manufacture including instruction means that implement the function/act specified in the flowchart and/or block diagram block(s).

The computer program instructions can also be loaded onto a computer or other programmable data processing apparatus to cause a series of operational steps to be performed on the computer or other programmable apparatus to produce a computer-implemented process so that the instructions which execute on the computer or other programmable apparatus provide steps for implementing the functions/acts specified in the flowchart and/or block diagram block(s). Alternatively, computer program implemented steps or acts can be combined with operator or human implemented steps or acts in order to carry out an embodiment of the present disclosure.

Referring to the drawings and, in particular, FIG. 1, there is shown a four party payment (credit, debit or other) card system generally represented by reference numeral 100. In card system 100, card holder 120 submits the payment card to the merchant 130. The merchant's point of sale (POS) device communicates 132 with his acquiring bank or acquirer 140, which acts as a payment processor. The acquirer 140 initiates, at 142, the transaction on the payment card company network 150. The payment card company network 150 (that includes the financial transaction processing company) routes, via 162, the transaction to the issuing bank or card issuer 160, which is identified using information in the transaction message. The card issuer 160 approves or denies an authorization request, and then routes, via the payment card company network 150, an authorization response back to the acquirer 140. The acquirer 140 sends approval to the POS device of the merchant 130. Thereafter, seconds later, the card holder completes the purchase and receives a receipt.

The account of the merchant 130 is credited, via 170, by the acquirer 140. The card issuer 160 pays, via 172, the acquirer 140. Eventually, the card holder 120 pays, via 174, the card issuer 160.

In accordance with this disclosure, one or more boxes with RFID readers for every type of RFID tag (credit cards, access cards, loyalty cards, driver's licenses, and the like) are installed inside selected doors of a retail environment, e.g., a shopping mall. As shoppers enter the doors and are forced to walk within the range of the readers, all available RFID information is read and correlated together. Long range RFID readers are used to track the shopper as they walk around the retail environment in real time.

The information collected includes, for example, credit card details (card numbers, expiry date, number of cards found in wallet, and the like), consumer residence, route the consumer takes through the mall, any pauses in movement such as to look in a window, details of purchases made, and the like. The data is processed by a modeling engine that selects the right advertising to display based on the characteristics of the population walking in front of the display.

RFID is a technology that uses radio waves to transfer data from an electronic tag, called an RFID tag, label or secure data card, attached to an object, through a reader for the purpose of identifying and tracking or monitoring the object. Some RFID tags can be read from several meters away and beyond the line of sight of the reader. The application of bulk reading enables an almost-parallel reading of tags.

The tag's information is stored electronically. The RFID tag includes a small RF transmitter and receiver. An RFID reader transmits an encoded radio signal to interrogate the tag. The tag receives the message and responds with its identification information. Most RFID tags contain at least two parts: one part is an integrated circuit (i.e. the RFID chip) for storing and processing information, modulating and demodulating a radio-frequency (RF) signal, and other specialized functions; the other part is an antenna for receiving and transmitting the signal.

RFID tags can be either passive, active or battery assisted passive. Passive RFID does not use a battery. Instead, the tag uses the radio energy transmitted by the reader as its sole energy source. An active tag has an on-board battery that always broadcasts or beacons its signal. A battery-assisted passive (BAP) has a small battery on board that is activated when in the presence of a RFID reader.

A radio-frequency identification system uses tags, or labels attached to the objects to be identified. Two-way radio transmitter-receivers called readers or interrogators send a signal to the tag and read its response.

RFID tags can be passive, active, or battery-assisted passive. An active tag has an on-board battery and periodically transmits its ID signal. A battery-assisted passive (BAP) has a small battery on board and is activated when in the presence of a RFID reader. A passive tag is cheaper and smaller because it has no battery. However, to start operation of passive tags, they must be illuminated with a power level roughly three magnitudes stronger than for signal transmission. That makes a difference in interference and in exposure to radiation.

RFID tags contain at least two parts: an integrated circuit for storing and processing information, modulating and demodulating a radio-frequency (RF) signal, collecting DC power from the incident reader signal, and other specialized functions; and an antenna for receiving and transmitting the signal. The tag information is stored in a non-volatile memory. The RFID tag includes either a chip-wired logic or a programmed or programmable data processor for processing the transmission and sensor data, respectively.

A RFID reader transmits an encoded radio signal to interrogate the tag. The RFID tag receives the message and then responds with its identification and other information. This can be only a unique tag serial number, or product-related information, such as a stock number, lot or batch number, production date, or other specific information.

RFID systems can be classified by the type of tag and reader. A Passive Reader Active Tag (PRAT) system has a passive reader that only receives radio signals from active tags (battery operated, transmit only). The reception range of a PRAT system reader can be adjusted from 1-2,000 feet (0.30-610 m) to allow flexibility in applications such as asset protection and supervision.

An Active Reader Passive Tag (ARPT) system has an active reader, which transmits interrogator signals and also receives authentication replies from passive tags. An Active Reader Active Tag (ARAT) system uses active tags awoken with an interrogator signal from the active reader. A variation of this system could also use a Battery-Assisted Passive (BAP) tag that acts like a passive tag but has a small battery to power the tag's return reporting signal.

Fixed readers can be set up to create a specific interrogation zone that can be tightly controlled. This allows a highly defined reading area for when tags go in and out of the interrogation zone.

Signaling between the reader and the tag is done in several different incompatible ways, depending on the frequency band used by the tag. Tags operating on LF and HF bands are, in terms of radio wavelength, very close to the reader antenna because they are only a small percentage of a wavelength away. In this near field region, the tag is closely coupled electrically with the transmitter in the reader. The tag can modulate the field produced by the reader by changing the electrical loading the tag represents. By switching between lower and higher relative loads, the tag produces a change that the reader can detect. At UHF and higher frequencies, the tag is more than one radio wavelength away from the reader, requiring a different approach. The tag can backscatter a signal. Active tags can contain functionally separated transmitters and receivers, and the tag need not respond on a frequency related to the reader's interrogation signal.

According to one embodiment of the present disclosure, a consumer carries a payment card having a RFID tag. The payment card comprises at least one RFID chip, antenna tuned to receive an RF reader signal and a passive or active power module to power the RFID chip. The RFID chip comprises an RF transmitter and one or more processors and memory units configured to implement a communication module that stores information and when activated reads and sends the information to the RF transmitter to transmit an RF data signal via the antenna.

Referring to FIGS. 2A and 2B, an embodiment of a payment card 200 comprises a card 212. Card 212 can be of any size suitable for an intended application. For example, for a typical consumer point-of-sale (POS) application card 212 can be the size of a typical payment card. Card 212 can be formed from any suitable material, e.g. plastic. Certain unsecured information 214 can be imprinted onto the card. For example, a user name, account number, expiration date, and the like. The content of any unsecured information 214 will depend on the application for which the card is used. The information can be specific to a particular user to whom the card is assigned, or to a particular object to which the card is attached.

The RFID technology of card 200 is implemented with an antenna 216, a power module 218 and at least one (typically one) RFID chip 220. Antenna 216 is configured to receive an RF reader signal 222 from a card reader 224. Power module 218 optionally converts power drawn exclusively from the received reader signal 222 to power RFID chip 220. If card 200 is not in sufficiently close proximity to card reader 224, the card will not be powered on. What constitutes "sufficiently close proximity" depends on the transmit power of the card reader and the power requirements of the card.

RFID chip 220 comprises at least one (typically one) microprocessor 226 and one or more memory units 228 configured to store secure information 230 and 236 about the user or object and when activated read and send the secure information to an RF transmitter 232 to transmit an RF data signal 233 via antenna 216. Memory units 228 can comprise processor memory in processor 226 or chip-level memory accessible by processor 226. The RF data signal 233 may or may not be transmitted at the same frequency as the reader signal. In some exemplary embodiments, the card preferably transmits the RF data signal in an "open format" to maintain backward compatibility with an installed base of RFID card readers. The "open format" is a format that is both compatible with existing card readers and one that does not require specific knowledge or permissions to read.

Figure 3:
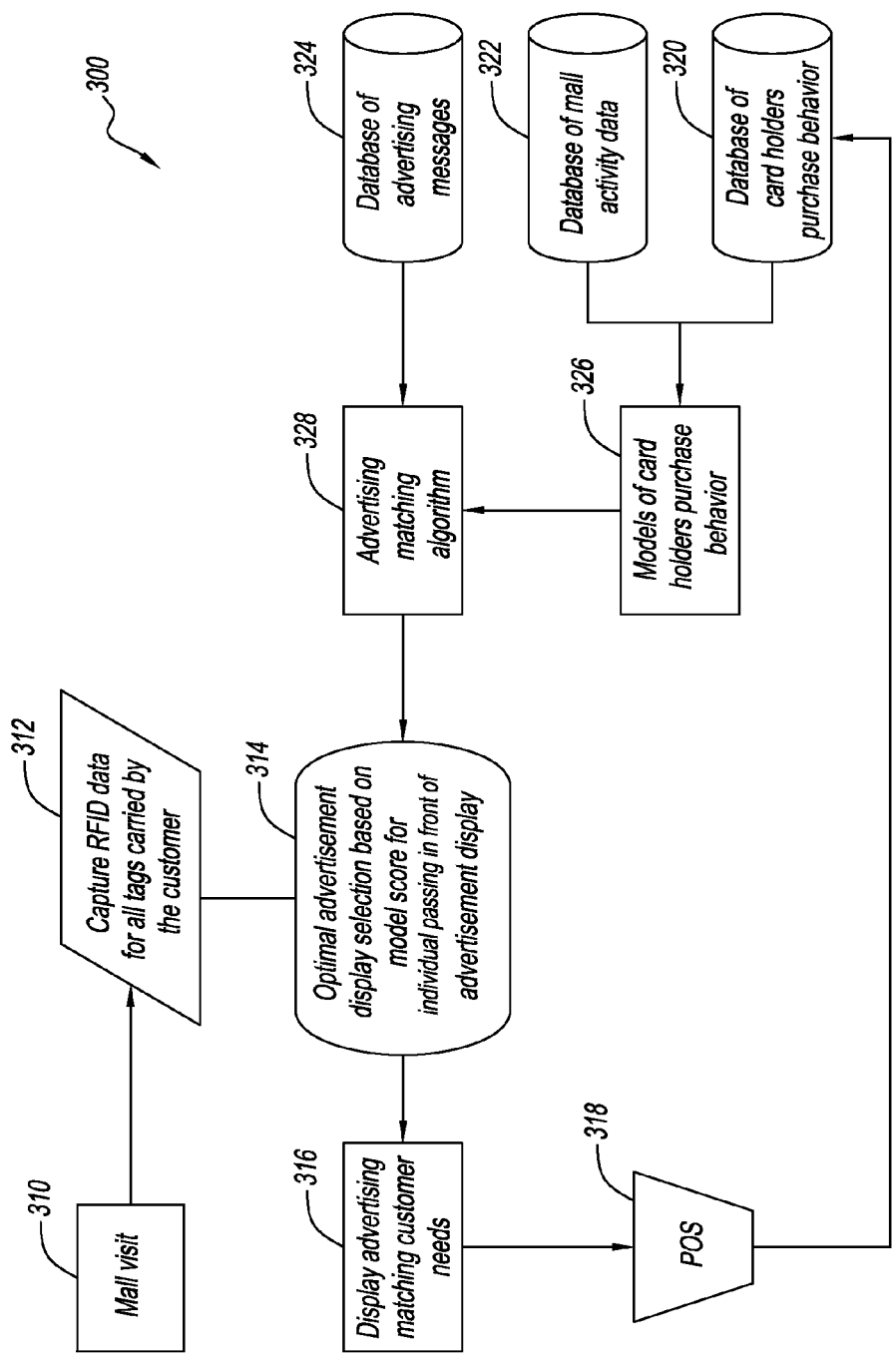
FIG. 3 illustrates a block diagram of a system according to the present disclosure that detects events associated with a consumer in a retail environment and identifies advertising content for presentation to a consumer in a retail environment on a real time basis.

In accordance with this disclosure, a system 300 is provided for the real time delivery of targeted advertising content to a merchant based on predictive behavioral modeling of a consumer's interest in an item or service available in a retail environment while the consumer is actually present in the retail environment. Referring to FIG. 3, a consumer makes a shopping visit to a retail environment such as a shopping mall 310. The consumer carries at least one payment card, and optionally other cards, that have RFID tags. Preferably, each store in the retail environment is monitored by RFID readers. The RFID reader can detect when a RFID tag associated with a consumer enters the store or detection region monitored by the RFID reader. The RFID reader can also detect the location of the RFID tag within the store or detection region. At 312, one or more RFID readers capture data for consumers carrying payment cards having RFID tags.

The system 300 includes one or more databases 320 configured to store a first set of information comprising payment card holder information including at least purchasing and payment activities attributable to the payment card holders.

The system 300 also includes one or more databases 322 configured to store a second set of information comprising payment card holder activity and location in a retail environment, e.g., a shopping mall. As described herein, the retail environment has at least one RFID reader and the consumer has at least one payment card having at least one RFID tag. The at least one RFID reader is capable of operably communicating with the at least one RFID tag to determine activity and location of the payment card holder in the retail environment.

The system 300 further includes one or more databases 324 configured to store a third set of information comprising merchant advertising information. Illustrative merchant advertising information can represent a wide variety of categories and attributes depending on the particular merchant and consumer. In one embodiment, advertisements can be based on retail (e.g., department stores, discount stores, hardware stores, sporting goods stores), apparel (e.g., women's apparel, men's apparel, family apparel), automotive (e.g., new car sales, used car sales, automotive stores, repair shops), travel (e.g., domestic, international, cruises), restaurants (e.g., fine dining, family restaurants, fast food), entertainment (e.g., movies, professional sports, concerts, amusement parks), accommodations (e.g., luxury hotels, motels, casinos), etc. The advertising content can include a commercial for a product or service, information about the product or service, suggested activities that incorporate the product or service, recommendations of other products or services that can be used in conjunction with the product or service, and coupons or rebates for the product or service.

In accordance with this disclosure, a processor is configured to generate one or more predictive behavioral models 326 based, at least in part, on the first set of information and the second set of information. The one or more predictive behavioral models are associated with the third set of information using one or more advertising matching algorithms 328. The one or more advertising matching algorithms 328 identify matches of specific advertisements with consumers based on the predictive behavioral modeling. The matching advertisements are conveyed to a merchant in the retail environment to enable the merchant to select at 314 one or more targeted offers to the consumer who is passing by the store front having the advertisement display. At 316, the merchant displays the selected advertisement matching the customer needs. A payment transaction is completed at the point-of-sale (POS) at 318 and that purchase and payment information is then transferred to the one or more databases 320 configured to store a first set of information comprising payment card holder information including at least purchasing and payment activities attributable to the consumers.

In an embodiment, the merchant provides feedback to the payment card company to enable the payment card company to monitor and track impact of targeted offers made to customers of the merchant. This "closed loop" system allows a merchant and payment card company to track advertising campaigns, measure efficiency of the targeting, and make any improvements for the next round of campaigns.

Purchase behaviors and shopping mall activity habits are used to develop the algorithms that match certain customer profiles and characteristics to certain advertising. The developed algorithms are applied to customers standing or walking in front of advertisement displays so that the best offer can be displayed where the right customers can see them. The response to the advertisement can be measured and fed back to the system to further optimize the predictive behavioral models.

In an embodiment of this disclosure, a system and a method are provided for the real time delivery of targeted advertising content to a merchant based on predictive behavioral modeling of a consumer's interest in an item or service available in a retail environment. The retail environment can be divided into a number of detection regions, e.g., one or more RFID readers positioned in the retail environment. Markers, such as a RFID tag, are associated with consumers that are visiting the retail environment. A merchant in a retail environment can detect when a consumer having a RFID marker enters a detection region and when a consumer having a RFID marker leaves a detection region. Moreover, the merchant can detect the location of the consumer having a RFID marker in the detection region. When the detected location of the consumer having a RFID marker indicates that the consumer has entered a retail environment, the merchant can deliver, or request to another entity (e.g., payment card company) to deliver relevant advertisements for presentation to the consumer on a real time basis.

The delivered advertising content is targeted to the consumer based on the predictive behavioral models generated in accordance with this disclosure. The targeted advertising content can also be based on other factors, including a previous implicit or explicit indication of interest in a product by the consumer, the particular products or categories of products contained in the store, the amount of time the consumer has spent in the current store or in a different store in the retail environment (i.e., the consumer's dwell time), past purchases, or other shopping behavior observed during present or prior shopping sessions. The delivered advertising content can also be targeted to the consumer based on real-time preferences of the retailer, such as product expiration dates, inventory levels, profit margins, or the need to clear older merchandise in order to create capacity for newer models or improved versions of the merchandise. The consumer is thereby presented with a very timely and targeted advertising message at the exact time when the consumer is making a purchase decision at the retail establishment.

In some embodiments, a session log can be maintained that stores all events associated with a consumer's visit to a retail establishment, as well as implicit and explicit indications of interest from the consumer both before and after entering the retail establishment. The session log can contain a record of all implicit and explicit indications of interest from the consumer, stores that the consumer visited, certain actions the consumer performed in each location, and subsequent purchases that the consumer made as part of a check out process. The session log can be used to better target advertisements that are delivered to the consumer during the visit. Moreover, for those consumers that are capable of being tracked across visits, the session log can be stored and a profile of the consumer's preferences constructed over time. The session log can be included in the one or more databases configured to store a first set of information comprising payment card holder information, and the one or more databases configured to store a second set of information comprising payment card holder activity and location in a retail environment.

From the payment card holder information, information associated with the consumer can be identified. Such information can include, for example, the consumer's product or brand preferences, coupons associated with products of interest to the consumer, past purchases made by the consumer, past online behavior of the consumer (e.g., a record of sites that were previously accessed, content viewed, and the like), a record of the consumer's interests, an identification of one or more loyalty programs in which the consumer participates, a record of accumulated points in the one or more loyalty programs, a record of items in which the consumer has implicitly or explicitly indicated an interest, or any other information that characterizes the consumer.

The retail environment can be any environment in which consumers purchase products, such as a shopping mall, shopping center, mini-mall, shopping plaza, and the like. Illustrative of stores included in such retail environment include, for example, anchor stores such as Kohl's, Wal-Mart or Kmart, grocery stores, drug stores, office supply stores, hardware stores, auto parts stores, banks, restaurants, and the like. Such retail environments normally have several stores that allow the consumer to shop and the retailer to advertise various products that are available for purchase by the consumer.

Deployed in the retail environment is a system that allows advertising content to be displayed to consumers in a targeted and trackable manner. The retail environment is divided into a number of stores or detection regions. A detection region is a region in which the presence of a RFID marker associated with a consumer can be detected by a RFID reader, and the location of the RFID marker in the detection region determined. The size of each detection region is determined by the RFID monitoring technology used to detect the presence and location of a RFID marker.

Each store or detection region in the retail environment is monitored by RFID readers. The RFID reader can detect when a RFID marker associated with a consumer enters the store or detection region monitored by the RFID reader. The RFID reader can also detect the location of the RFID marker in the store or detection region. A "marker" is any technology component that allows the presence and location of the marker to be detected within a desired accuracy in the retail environment. For example, a marker can be a passive tag, such as a RFID tag that operates in the VHF, UHF or SHF bands. As another example, the marker can be an active tag, such as certain RFID tags (IEEE 1902.1) tags that operate in the LF band.

As described herein, the RFID marker is embedded in or attached to a payment card that is carried by the consumer. The RFID marker can also be embedded in or attached to other cards (e.g., a store loyalty card, a driver's license, and the like) that this associated with the retail environment and carried by the consumer. The RFID marker can be permanently affixed or embedded in the card (e.g., in a payment card), or the marker can be temporarily affixed (e.g., by the use of a sticker or other semi-permanent means to affix a marker to a payment card, driver's license, and the like). The RFID marker can be permanently associated with the consumer, such as a marker on a payment card or driver's license, that is carried by the consumer during multiple visits.

When the monitoring entity detects the presence of a marker in the associated store or detection region, a message can be sent to the merchant indicating that the marker has entered the store or detection region. A further message can be sent to the merchant that includes the delivery of advertising content, or the identity of advertising content, for display to the consumer. The merchant selects advertising content for display and where it is presented to the consumer. The advertising presented to the consumer can relate to the one or more products or categories of products that are contained in or associated with the store in the retail environment. Since the merchant can request advertising content when a RFID marker is detected in the store, the advertising content can be selected so that it is targeted to the consumer. Moreover, the advertising content can also be selected so that it represents the most recent or up-to-date advertising that is available for the associated one or more products or categories of products. Also, since the advertising content is delivered to the consumer at the time that the consumer is making a purchase decision, the effectiveness of the advertising content will typically be significantly better than advertising delivered in other channels to the consumer.

The advertising content that is presented to consumers is anything that an advertiser feels will be beneficial to the sale of products. For example, advertising content can include a commercial for a product, information about the product, suggested activities that incorporate the product, recommendations of other products that can be used in conjunction with the product, and coupons or rebates for the product.

When the RFID marker has left the store, the presentation of the advertising can be halted unless other RFID markers remain in the store. When the marker is no longer in the associated detection region, a message can be sent to the monitoring entity indicating that the RFID marker has left the region. The indications that a RFID marker has entered and left a store or detection region enable the system to track and predict a path of the RFID marker though the retail establishment.

Figure 4:
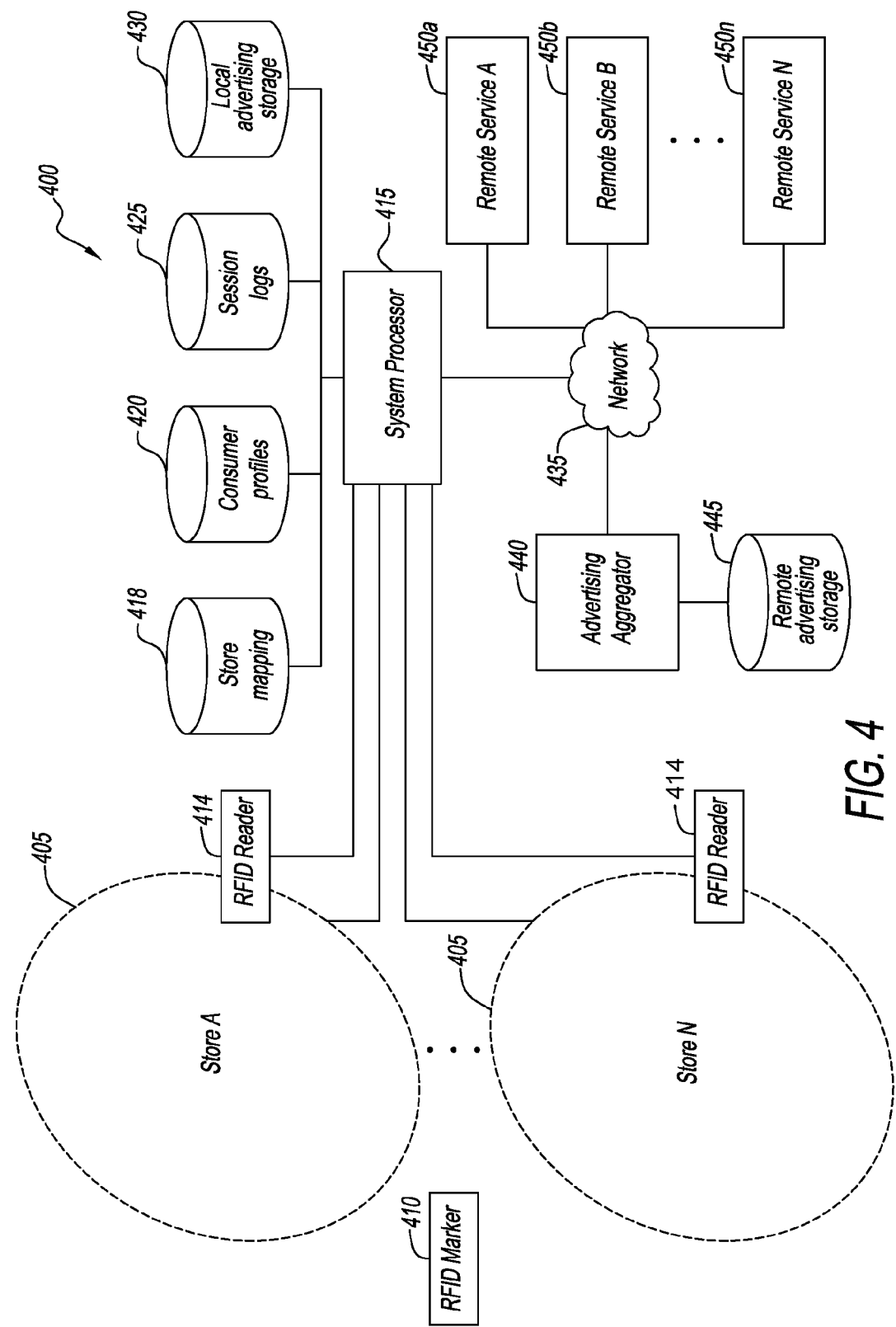
FIG. 4 illustrates a block diagram of an embodiment of a system according to the present disclosure that detects events associated with a consumer in a retail environment and identifies advertising content for presentation to a consumer in a retail environment on a real time basis.

FIG. 4 is block diagram of a system 400 that detects events associated with a RFID marker 410 in a retail establishment and identifies relevant advertising content for presentation to a consumer on a real time basis. As depicted in FIG. 4, the system includes a number of RFID readers 414. Each RFID reader 414 is capable of detecting RFID markers 410 that enter into an area in proximity of the RFID reader 414. Such a detection area is referred to herein as a store or detection region 405 (e.g., Store A through Store N in FIG. 4). The RFID monitoring technology is selected such that the store 405 is of a generally-known size and limited range, allowing multiple stores to be deployed adjacent to one another in the retail environment. Preferably, the monitoring technology is one or more RFID readers 414 operating to read RFID markers or tags 410. Depending on the selected type and frequency of RFID tag 410 utilized, a detection area can extend outward from 0.1 to 15 meters from a store 405. In addition to detecting when a RFID marker 410 enters a corresponding detection region 405, each RFID reader 414 can detect when the RFID marker 410 leaves the detection area 405.

In addition to being able to detect when a RFID marker 410 enters and leaves a store or detection region 405, the RFID reader 414 can also detect a location of the RFID marker 410 within the store or detection region 405. While the location accuracy of the RFID readers 414 varies, the RFID readers 414 typically allow the location of a RFID marker 410 to be detected with sub-meter accuracy.

Within each store or detection region 405, there can be one or more advertising display areas. The advertising display areas are used to present advertising content to consumers. Display areas can include windows, walls and all conventional areas useful for advertising and marketing goods and services. The advertisements can take any form including, for example, audio, video, print, and other conventional methods known in the art.

Each RFID reader 414 can maintain records of the number and location of stores 405 and displays that are contained in the detection region monitored by the RFID reader 414. The location of the stores 405 and displays can be stored in a data storage area, and updated on a periodic or non-periodic basis. For example, a new mapping of stores 405 and displays can be distributed when the owner of a retail environment changes the layout of stores, e.g., constructs new stores.

By maintaining a record of the size and position of each store 405 and displays within the detection region, and then tracking the location of each RFID marker 410 as it moves within the detection region, the RFID reader 414 is able to detect when a RFID marker 410 enters and leaves a store 405 or display area. The RFID reader 414 does so by comparing the current location of a RFID marker 410 with the locations of stores 405 and displays in a detection region in order to determine whether the current location indicates that the RFID marker 410 has entered, remains inside, or has exited the store 405.

The RFID readers 414 are coupled to a system processor 415 via a wired or wireless connection. When a RFID reader 414 detects a new RFID marker 410 entering a detection region that the RFID reader 414 is monitoring, the RFID reader 414 generates and transmits a message to the system processor 415. The message contains a RFID marker 410 identifier (a "marker ID") and a detection region identifier (a "region ID") to notify the system processor of the presence of the RFID marker 410 within the detection region. When the RFID reader 414 subsequently detects that the RFID marker 410 has entered a store 405 that is in the detection region, the RFID reader 414 generates and transmits a hypertext transfer protocol (HTTP) request to the system processor 415. The HTTP request contains the RFID marker ID and a store or display area identifier (a "store ID") to notify the system processor 415 of the presence of the RFID marker 410 in the store 405. The HTTP request also serves as a request for the system processor 415 to provide advertising content for presentation on the corresponding display area in the store 405.

When it receives an HTTP request from a RFID reader 414, the system processor 415 identifies and delivers relevant advertising content to the appropriate store 405 for presentation to the consumer. The advertising content is targeted to the consumer based on the predictive behavioral models generated herein and other factors. A variety of other factors include, for example, the store in which the consumer is located (and the corresponding product, groups of products, or categories of products associated with that store), past indications of interest in a particular product or category of products, past purchases, and any other known or predicted information about that consumer.

To enable targeting of advertising content, the system processor 415 is coupled to a number of databases that store information about the store, display area and consumer. The system processor 415 is coupled to a store mapping database 418, which contains information about each of the stores 405 in the retail environment. The store mapping database 418 can contain, for example, for each store: (i) information about the location of the store in the retail environment; (ii) the type of the store (e.g., electronic, sports, clothing, restaurant, and the like); (iii) an address of the store so that advertising content can be directed to the store for display; and (iv) an identification of the product, products, or categories of products in or associated with the store. The store mapping database 418 is indexed via the store identifier, which uniquely identifies each store 405 in a particular retail environment.

The system processor 415 is also coupled to a consumer profile database 420, which maintains various information about any consumer that is capable of being tracked across multiple visits to the retail environment (e.g., payment card customers, customers who have opted to allow the store to maintain records on shopping behavior, such as by joining a store loyalty program). The consumer profile database 420 can contain, for example, for each consumer: (i) the marker ID associated with the consumer; (ii) any demographic information that is known or predicted about the consumer, such as the gender, ethnicity, age, or income bracket of the consumer; (iii) a record of past purchases and purchase behavior of the consumer; (iv) a record of one or more loyalty programs in which the consumer participates; and (v) a record of accumulated points or awards in the one or more loyalty programs. The consumer profile database 420 is indexed via the marker ID that is associated with each consumer (e.g., via a marker ID associated with a payment card that is held by a consumer).

In particular, the consumer profile database 420 includes one or more databases configured to store a first set of information comprising payment card holder information including at least purchasing and payment activities attributable to the payment card holders (see database 320 in FIG. 3).

The system processor 415 is also coupled to a session logs or database 425. The session database 425 maintains a record of all events that are associated with a consumer during a visit to the retail environment. An event may be, for example, (i) the entry of the consumer into or exit from a detection region (as reflected by the detection of the RFID marker 410 associated with the consumer), (ii) the entry of the consumer into or exit from a store 405 (as reflected by a determination that the location of the RFID marker 410 within the detection region places the RFID marker 410 within the store 405); (iii) the presentation of an advertisement to the consumer in a store 405; and (iv) any other details of the checkout process (e.g., the payment instrument, the identity of products purchased or returned, and the like). A set of events associated with a consumer's visit is referred to herein as a session log, and can be stored or deleted following the consumer's visit. Such a session log can begin, for example, when a new RFID marker 410 is first detected in the retail environment. The session log can end when the RFID marker 410 is detected at a check-out area, or when a threshold period of time has elapsed without detecting a RFID marker 410 in a detection region, thereby suggesting that the RFID marker 410 has left the retail environment. The session database 425 is typically indexed by marker ID, store ID, or any of the other fields that are maintained in the session database.

In particular, the session database 425 include one or more databases configured to store a second set of information comprising payment card holder activity and location in a retail environment. The retail environment has at least one RFID reader 414 and the payment card holder has at least one payment card having at least one RFID tag 410. The at least one RFID reader 414 is capable of operably communicating with the at least one RFID tag 410 to determine activity and location of the payment card holder in the retail environment (see database 322 in FIG. 3).

Data obtained by the system processor 415 from the store mapping database 418, the consumer profile database 420, and the session database 425 are utilized to select the advertising content to present to consumers in the identified store 405. The system processor 415 is coupled to a local ad storage area 430 that contains advertising content of a merchant that is associated with the products or categories of products that are available at the retail establishment. Based on multiple factors, including without limitation the stored consumer information, the system processor 415 selects one or more advertisements for presentation to the consumer. The system processor 415 then transmits the selected advertising content to the appropriate store 405 via an HTTP response. The system processor 415 can send messages to, and receive messages from, stores 405 within each detection region using a wired or wireless protocol. For example, a system processor 415 can communicate with a store using WiFi or another wireless communication protocol. As another example, a system processor can communicate with a store across a wired network. The system processor 415 coordinates the presentation of the received advertising content to consumers via the store display areas.

In particular, the system processor 415 is configured to generate one or more predictive behavioral models based at least in part on the first set of information or consumer profiles 420 and the second set of information or session logs 425. The one or more predictive behavioral models are associated with the third set of information or local advertising storage 430 using one or more advertising matching algorithms. The one or more advertising matching algorithms identify matches of specific advertisements with consumers based on the predictive behavioral modeling.

Purchase behaviors and shopping mall activity habits are used to develop the algorithms that match certain customer profiles and characteristics to certain advertising. The developed algorithms are applied to customers standing or walking in front of advertisement displays so that the best offer can be displayed where the right customers can see them. The response to the advertisement can be measured at and fed back to the system to further optimize the predictive behavioral models.

The advertising content for a merchant that is stored in the local advertisement storage area 430 can be periodically updated by the system processor 415. The system processor is coupled via a public or private network 435 to an advertising aggregator 440. The advertising aggregator 440 periodically accesses or crawls remote services 450a, 450b, . . . 450n to identify advertising content for a merchant that may be presented to consumers. The remote services can be Internet advertising syndicators (e.g., Google, Microsoft, AOL, and the like), advertising agencies or agents, or manufacturers of products or providers of services (e.g., Johnson & Johnson, Proctor and Gamble, General Mills, Coleman, and the like) that are affiliated with a merchant in the retail environment. Advertising content that is identified by the advertising aggregator 440 is stored in a remote advertisement storage area 445. On a periodic basis, the advertising aggregator 440 transmits new advertising content for a merchant to the system processor 415 to replace or supplement existing advertising content that is contained in the local advertisement storage area 430. Advertising content for a merchant in the local advertisement storage area can be removed when the content has expired or when the performance of the advertising content falls below a threshold performance level.

In addition, the advertising aggregator 440 can compare the performance of advertising content stored in the local advertisement storage area 430 being used by the system processor 415 with the anticipated performance of new advertising content stored in the remote advertisement storage area 445. If the new advertising content is expected to perform better (as measured by, for example, conversion or revenue payable to the merchant), then the advertising aggregator 440 transmits new advertising content to replace some or all of the advertising content for the merchant. The analysis of the performance of advertising content can be performed on a periodic (e.g., daily, weekly, monthly) or non-periodic (e.g., when new advertising content is obtained) basis. The merchant participates directly in determining the advertising content for display to consumers.

The advertisements are conveyed to a merchant in the retail environment to enable the merchant to select one or more targeted offers to the consumer who is passing by the store front having the advertisement display. The merchant displays the selected advertisement matching the customer needs. A payment transaction is completed at the point-of-sale (POS) and that purchase and payment information is then transferred to the one or more databases configured to store a first set of information comprising payment card holder information including at least purchasing and payment activities attributable to the consumers (see database 320 of FIG. 3).

In addition to managing the delivery of advertising content via HTTP responses to the stores, the system processor 415 also maintains a session log that is associated with each RFID marker 410 that is present in the retail environment. Each session log is a record of all events that are associated with the corresponding RFID marker 410 during a defined timeframe (typically measured as a shopping session or a consumer's visit to the retail establishment). As a RFID marker 410 is carried through the retail environment by a consumer, the system processor 415 maintains a record of all detection region events that are associated with the RFID marker 410. For example, the system processor 415 stores a record of the RFID marker 410 entry into different detection regions, entry and exit into stores 405 in a region, exit from detection regions, and dwell times in each region or store 405 in the session log that is associated with the RFID marker 410. In addition, the system processor 415 maintains a record of any advertising content that is presented to a store 405 while the RFID marker 410 is present in the corresponding store 405. Finally, the system processor 415 maintains a record of all check out or payment events associated with the RFID marker 410, such as the purchase of particular products or the use of coupons or other offers during a payment process.

Those skilled in the art will appreciate that some or all communications between system 400 components and external services, and some or all of the data contained in the data storage areas, can be encrypted or otherwise secured to protect any confidential or other proprietary information that is managed or used by the system. For example, personally-identifiable information such as names, addresses, demographic information, and the like can be encrypted in order to minimize the likelihood that the data can be accessed by unauthorized third parties.

In accordance with the method of this disclosure, one or more predictive models can be generated based at least in part on the first set of information comprising payment card holder information and the second set of information comprising payment card holder activity and location in the retail environment. Predictive models can be selected based on the information obtained and stored in the one or more databases. The selection of information for representation in the predictive models can be different in every instance. In one embodiment, all information stored in each database can be used for selecting predictive models. In an alternative embodiment, only a portion of the information is used. The generation and selection of predictive models can be based on specific criteria.

Predictive behavioral models are generated from the first set of information comprising payment card holder information obtained from the one or more databases, the second set of information comprising payment card holder activity and location in the retail environment obtained from the one or more databases, and optionally demographic and/or geographic information obtained from other databases. The information is analyzed, extracted and correlated by, for example, a financial transaction processing company (e.g., a payment card company), and can include financial account information, performing statistical analysis on financial account information, finding correlations between account information and consumer behaviors, predicting future consumer behaviors based on account information, relating information on a financial account with other financial accounts, or any other method of review suitable for the particular application of the data, which will be apparent to persons having skill in the relevant art.

Activities and characteristics attributable to the consumers (e.g., payment card holders) based on the one or more predictive behavioral models are identified. The consumers have a propensity to carry out certain activities and to exhibit certain characteristics based on the one or more predictive behavioral models. The activities and characteristics attributable to the consumers and based on the one or more predictive behavioral models are conveyed, for example, by a financial transaction processing entity to a merchant. This enables a targeted offer or other communication to be made by the merchant to the consumers. The transmittal can be performed by any suitable method as will be apparent to persons having skill in the relevant art.

In addition to the payment card holder information and payment card holder activity and location information in the retail environment, predictive behavioral models can optionally be defined based on geographical or demographical information obtained from other databases, including but not limited to, age, gender, income, marital status, postal code, income, spending propensity, and familial status. In some embodiments, predictive behavioral models can be defined by a plurality of geographical and/or demographical categories. For example, a predictive behavioral model can be defined for any card holder with an income between $50,000 and $74,999, which card holder is between the ages of 20 and 29, and is single.

Predictive behavioral models can also be based on behavioral variables. The payment card holder information and payment card holder activity and location information in the retail environment can be used to determine an individual's likeliness to spend. An individual's likeliness to spend can be represented generally, or with respect to a particular industry (e.g., electronics), retailer (e.g., Macy's®), brand (e.g., Apple®), or any other criteria that can be suitable as will be apparent to persons having skill in the relevant art. An individual's behavior can also be based on additional factors, including but not limited to, time, location, and season. For example, a predictive behavioral model can be based on consumers who are likely to spend on electronics during the holiday season, or on consumers whose primary expenses are in a suburb, but are likely to spend on restaurants located in a major city. The factors and behaviors identified can vary widely and can be based on the application of the payment card holder information.

Behavioral variables can also be applied to generate predictive behavioral models based on the attributes of the entities. For example, a predictive behavioral model of specific geographical and demographical attributes (e.g., single males in a particular postal code between the ages of 26-30 with an income between $100,000 and $149,999) can be analyzed for spending behaviors. Results of the analysis can be assigned to the predictive behavioral models. For example, the above predictive behavioral model is analyzed and reveals that the entities in the predictive behavioral model have a high spending propensity for electronics and are less likely to spend money during the month of February.

In an embodiment, the payment card holder information and the payment card holder activity and location information in the retail environment retrieved from the one or more databases can be analyzed to determine behavioral information of consumers. Also, information related to an intent of consumers can be extracted from the behavioral information.

The predictive behavioral models can be based upon the behavioral information of the consumers and the intent of the consumers. The predictive behavioral models can be capable of predicting behavior and intent in the consumers.

Predictive behavioral models can be developed, for example, to examine spend behaviors and create spend associations. A spend association can be a set of spend behaviors that predict another spend behavior. For example, people that tend to purchase jewelry display the following spend behaviors: spend at Macy's®, travel on cruise ships, go to the movie theaters once a month, and so forth.

Figure 5:
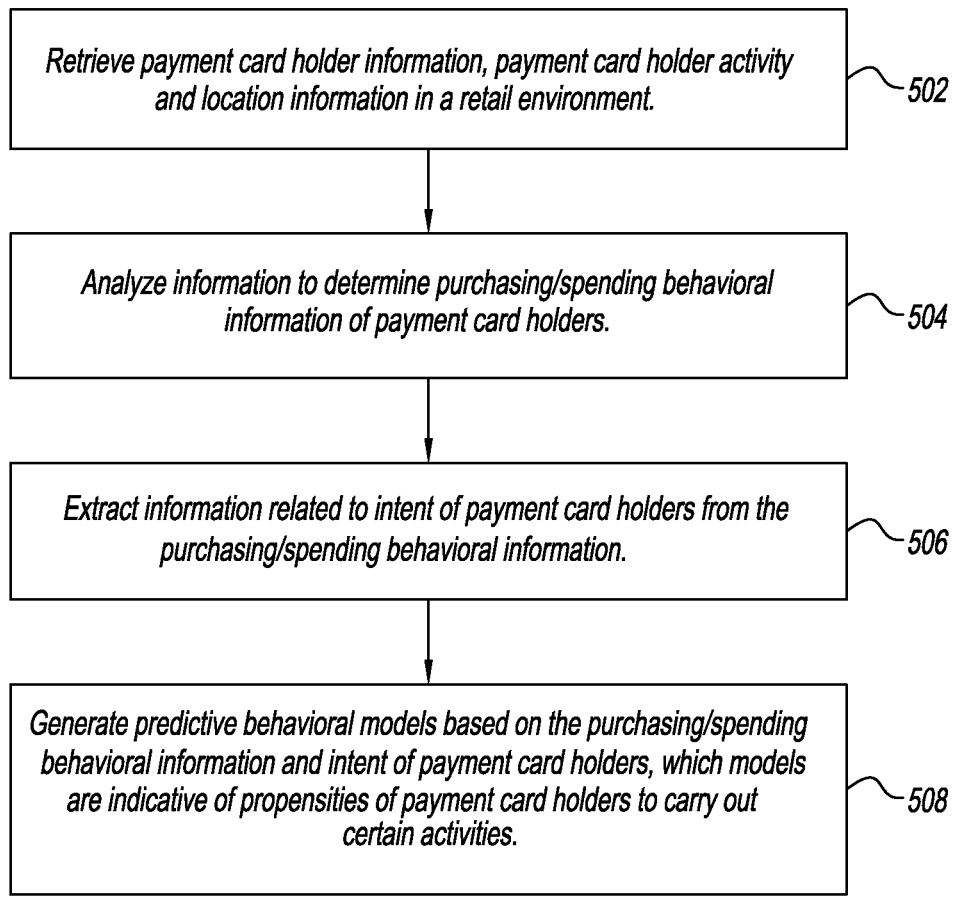
FIG. 5 is a flow chart illustrating a method for generating predictive behavioral models in accordance with exemplary embodiments of the present disclosure.

A method for generating one or more predictive behavioral models is an embodiment of this disclosure. Referring to FIG. 5, the method involves a payment card company (part of the payment card company network 150 in FIG. 1) retrieving, from one or more databases, payment card holder information and payment card holder activity and location information in the retail environment. The information 502 comprises payment card holder information, payment card holder activity and location information in the retail environment, and optionally demographic and/or geographic information. The payment card holder information and payment card holder activity and location information in the retail environment are analyzed 504 to determine purchasing/spending behavioral information of the payment card holders. Information related to an intent 506 of the one or more payment card holders is extracted from the purchasing/spending behavioral information. One or more predictive behavioral models are generated 508 based on the purchasing/spending behavioral information and intent of the one or more payment card holders by the payment card company. The one or more payment card holders have a propensity to carry out certain activities based on the one or more predictive behavioral models.

In analyzing payment card holder information and payment card holder activity and location information in the retail environment to determine behavioral information, intent and other payment card member attributes are considered. Developing intent of consumers involves models that predict specific spend behavior in the future and desirable spend behaviors. Examples include as follows: likely to purchase at Macy's® in the next 2 weeks; likely to spend at least $100 in consumer electronics in the next 30 days; likely to purchase a car in the next 60 days; likely to be interested in golfing; likely to be up for a cell phone renewal in the next 60 days; likely to be a business traveler; and the like.

Predictive behavioral models can equate to purchase behaviors. There can be different degrees of predictive behavioral models with the ultimate behavior being a purchase. An example using Macy's® is as follows: an extreme behavior is a consumer purchasing something once a week at Macy's® and spending five times what the average customer spends; a medium behavior is a consumer purchasing something at Macy's® once a month and spending twice what the average customer spends; and a low behavior is a consumer purchasing something at Macy's® once a year and spending what the average customer spends.

There is the potential for numerous predictive behavioral models including, for example, industries (e.g., consumer electronics, QSR), categories (e.g., online spend, cross border), geography spend (e.g., spend in New York City, spend in London), geography residence (e.g., live in New York City, live in Seattle), day/time spend (e.g., weekday spend, lunch time spend), calendar spend (e.g., spend a lot around Christmas, spend a lot on flowers before Valentine's Day), top number of merchants, and the like.

Other card holder attributes, in addition to the payment card holder information, useful in generating the predictive behavioral models include, for example, geography (e.g., zip code, state or country), and demographics (e.g., age, gender, and the like).

In an embodiment, the method further comprises a payment card company associating the one or more predictive behavioral models with merchant advertising information, and conveying at least a portion of the associated information to a merchant to enable the merchant to make one or more targeted offers to the one or more payment card holders. The one or more predictive behavioral models are capable of predicting behavior and intent in the one or more payment card holders. The one or more payment card holders are people and/or businesses, the activities attributable to the one or more payment card holders are financial transactions associated with the one or more payment card holders and the payment card holder activity and location information in the retail environment, and the characteristics attributable to the one or more payment card holders are demographics and/or geographical characteristics of the one or more payment card holders.

A behavioral propensity score can be used for conveying to the merchant the activities and characteristics attributable to the one or more payment card holders based on the one or more predictive behavioral models. The behavioral propensity score is indicative of a propensity to exhibit a certain behavior.

Consumers (e.g., payment card holders) can represent a wide variety of categories and attributes. In one embodiment, consumers can be created based on spending propensity of spending index in a particular industry. Industries can include, as will be apparent to persons having skill in the relevant art, restaurants (e.g., fine dining, family restaurants, fast food), apparel (e.g., women's apparel, men's apparel, family apparel), entertainment (e.g., movies, professional sports, concerts, amusement parks), accommodations (e.g., luxury hotels, motels, casinos), retail (e.g., department stores, discount stores, hardware stores, sporting goods stores), automotive (e.g., new car sales, used car sales, automotive stores, repair shops), travel (e.g., domestic, international, cruises), and the like. Each industry can include a plurality of consumers (e.g., based on location, income groups, and the like).

Consumers can also be based on predictions of future behavior. For instance, a financial transaction processing company can analyze financial account information (e.g., payment card holder information) and behavioral information to predict future behavior of a consumer.

A financial transaction processing company can analyze the generated predictive behavioral models (e.g., by analyzing the stored data for each entity comprising the predictive behavioral model) for behavioral information (e.g., spend behaviors and propensities). In some embodiments, the behavioral information can be represented by a behavioral propensity score. Behavioral information can be assigned to each corresponding predictive behavioral model.

Predictive behavioral models or behavioral information can be updated or refreshed at a specified time (e.g., on a regular basis or upon request of a party). Updating predictive behavioral models can include updating the entities included in each predictive behavioral model with updated payment card holder information, and optionally demographic data and/or updated geographic data. Predictive behavioral models can also be updated by changing the attributes that define each predictive behavioral model, and generating a different set of behaviors. The process for updating behavioral information can depend on the circumstances regarding the need for the information itself.

Although the above methods and processes are disclosed primarily with reference to purchasing/spending behaviors, it will be apparent to persons having skill in the relevant art that the predictive behavioral models can be beneficial in a variety of other applications.

For instance, predictive behavioral models can have useful applications in measuring the effectiveness of advertising or other consumer campaigns. A party can desire to discover the effectiveness of a particular advertising campaign in reaching a specific set of consumers.

For example, a consumer electronics store may want to know the effectiveness of an advertising campaign initiated by the store and directed towards male consumers of a specific age and income group. The store can provide the financial transaction processing company with the demographic (e.g., demographical and geographical) data corresponding to the market. The financial transaction processing company can identify predictive behavioral models and summarize relevant spend behaviors for the identified predictive behavioral models. Summary of the relevant spend behaviors (e.g., showing an increase or decrease in spending at the consumer electronic store) for each predictive behavioral model (e.g., including the predictive behavioral models of ideal consumers) can be provided to the consumer electronics store.

Predictive behavioral model data can also be combined or matched with other sources of data. For example, other transaction processing agencies, advertising firms, advertising networks, publishers, and the like can provide information on consumer groupings of their own. The financial transaction processing company can link or match the received consumer groupings, such as by matching groupings to generated predictive behavioral models based on geographical or demographical data.

One example of a predictive behavioral model is as follows: live in the following zip codes AND like GAP® AND like Nordstrom® AND like movies AND like consumer electronics, and the like. In 712, another example of a predictive behavioral model is as follows: between the ages of 25-35 AND like woman's apparel AND like Bloomingdales® AND like jewelry AND like family restaurants, and the like.

The predictive behavioral models are used to predict behavior and intent in consumers (e.g., the above predictive behavioral model examples are used to predict individuals likely to purchase at Macy's® in the next week). In accordance with this disclosure, the merchant can execute promotions to targeted potential purchasers on a real time basis.

One or more algorithms can be employed to determine formulaic descriptions of the assembly of the payment card holder information and optionally demographic and/or geographic information, using any of a variety of known mathematical techniques. These formulas, in turn, can be used to derive or generate one or more predictive behavioral models using any of a variety of available trend analysis algorithms.

It will be understood that the present disclosure can be embodied in a computer readable non-transitory storage medium storing instructions of a computer program that when executed by a computer system results in performance of steps of the method described herein. Such storage media can include any of those mentioned in the description above.

Where methods described above indicate certain events occurring in certain orders, the ordering of certain events can be modified. Moreover, while a process depicted as a flowchart, block diagram, and the like can describe the operations of the system in a sequential manner, it should be understood that many of the system's operations can occur concurrently or in a different order.

The terms "comprises" or "comprising" are to be interpreted as specifying the presence of the stated features, integers, steps or components, but not precluding the presence of one or more other features, integers, steps or components or groups thereof.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

The techniques described herein are exemplary, and should not be construed as implying any particular limitation on the present disclosure. It should be understood that various alternatives, combinations and modifications could be devised by those skilled in the art from the present disclosure. For example, steps associated with the processes described herein can be performed in any order, unless otherwise specified or dictated by the steps themselves. The present disclosure is intended to embrace all such alternatives, modifications and variances that fall within the scope of the appended claims.

What is claimed is:

1. A system comprising:
    a radio frequency identification (RFID) reader situated in a retail environment, wherein said RFID reader communicates with an RFID tag that is situated on a payment card of a payment card holder, to (i) determine that said payment card holder has entered said retail environment, (ii) track said payment card holder as said payment card holder walks around in said retail environment, and (iii) determine activity and locations of said payment card holder in said retail environment;
    a database configured to store a first set of information concerning said payment card holder, including purchasing and payment activities attributable to said payment card holder;
    a database configured to store a second set of information comprising said payment card holder activity and location in said retail environment;
    a database configured to store a third set of information comprising merchant advertising information;
    a processor configured to:
        receive from said RFID reader information that indicates (i) that said payment card holder has entered said retail environment, (ii) a route of said payment card holder as said payment card holder walks around in said retail environment, and (iii) activity and locations of said payment card holder in said retail environment;
        update said database configured to store said second set of information comprising said payment card holder activity and location in said retail environment;
        select a predictive behavioral model based at least in part on said first set of information and said second set of information;
        associate said predictive behavioral model with said third set of information, thus yielding associated information; and
        convey at least a portion of said associated information to a merchant to enable said merchant to make a targeted offer to said payment card holder.

2. The system of claim 1, wherein said processor is configured to algorithmically analyze said first set of information and said second set of information to select said predictive behavioral model.

3. The system of claim 1, wherein said processor is configured to algorithmically associate said predictive behavioral model with said third set of information to generate said targeted offer.

4. The system of claim 1,
wherein said predictive behavioral model provides a behavioral propensity score that is used for conveying to said merchant activities and characteristics attributable to said payment card holder based on said predictive behavioral model, and
wherein said behavioral propensity score is indicative of a propensity to exhibit a certain behavior.

5. The system of claim 1, wherein said processor is configured to:
track and measure an impact of said targeted offer based at least in part on purchasing and payment activities attributable to said payment card holder, after said targeted offer has been made.

6. The system of claim 1, wherein said processor is configured to:
analyze said first set of information and said second set of information to determine behavioral information of said payment card holder; and
extract information related to an intent of said payment card holder from said behavioral information.

7. The system of claim 6, wherein said predictive behavioral model is based upon said behavioral information and said intent.

8. The system of claim 1, wherein said first set of information comprises additional information selected from the group consisting of demographic information and geographic information.

9. The system of claim 1, wherein said second set of information comprises information on a path of said payment card holder in said retail environment, information on an amount of time spent by said payment card holder in a particular area of said retail environment, and information on stores of said retail environment visited by said payment card holder.

10. The system of claim 1, wherein said third set of information comprises a commercial for a product or service, information about said product or service, a suggested activity that incorporates said product or service, a recommendation of another product or service that can be used in conjunction with said product or service, and a coupon or rebate for said product or service.

11. The system of claim 1, wherein said processor is configured to:
convey at least a portion of said associated information to said merchant to enable said merchant to make said targeted offer to said payment card holder on a real time basis.

* * * * *